M. BYE.
STERILIZER FOR THERMOMETERS OR SIMILAR INSTRUMENTS.
APPLICATION FILED AUG. 13, 1917.
1,282,749.
Patented Oct. 29, 1918.
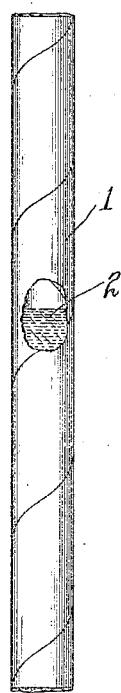
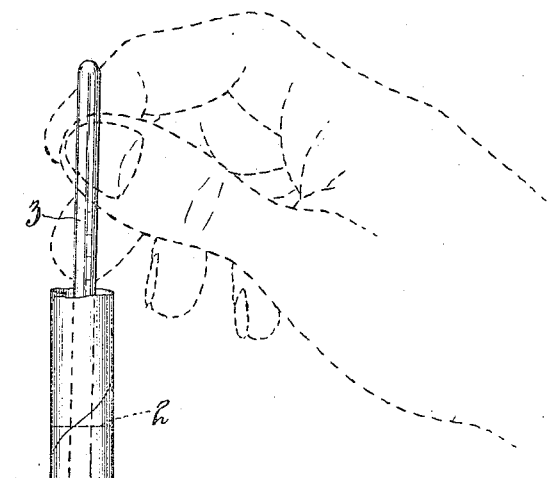
Inventor
Mortimer Bye
Bradford & Doolittle
Attorneys

UNITED STATES PATENT OFFICE.

MORTIMER BYE, OF INDIANAPOLIS, INDIANA.

STERILIZER FOR THERMOMETERS OR SIMILAR INSTRUMENTS.

1,282,749.     Specification of Letters Patent.     Patented Oct. 29, 1918.

Application filed August 13, 1917. Serial No. 185,913.

*To all whom it may concern:*

Be it known that I, MORTIMER BYE, a citizen of the United States, residing at Indianapolis, Marion county, and State of Indiana have invented and discovered certain new and useful Improvements in Sterilizers for Thermometers or Similar Instruments, of which the following is a specification.

My invention relates to sterilizers, and particularly to sterilizers for clinical thermometers, and similar instruments.

The object of the invention is to provide a container carrying a charge of sterilizing liquid, and which container shall be of such form and material as to be capable of being readily carried in the pocket of the user with the charge hermetically sealed therein, and which may be readily severed or disrupted at the time of use to receive the body of the thermometer or similar instrument inserted therein for the purpose of effecting sterilization of the same, and which is intended for and capable of only a single use, and which may be discarded without entailing more than a slight cost.

With this object in view my invention is illustrated in the accompanying drawing in which Figure 1 is a side view in elevation of the sterilizer in sealed condition, and Fig. 2 a similar view with one end thereof severed and the clinical thermometer inserted therein.

Referring to the drawings, 1 indicates the container which is preferably tubular in form and is made of paper coated with paraffin or similar liquid proofing substance, or it may be made of rubber or other material capable of retaining the liquid and resistant to alcohol or other antiseptic liquids which may be employed as the sterilizing medium. This tube is permanently sealed at both ends and is preferably made of a single piece of material. It is adapted to receive and retain a charge 2, of sterilizing liquid such as alcohol which is placed in the container before sealing one of the ends and is adapted to be permanently retained therein until one of such ends is severed or disrupted. 3 indicates a clinical thermometer which is adapted to be inserted within the container and within the body of sterilizing liquid after the use of the thermometer.

In the use of the article, a number of the sterilizers are adapted to be carried by the physician and when a test is to be made, one end of the container is torn off or otherwise severed or ruptured and then the thermometer is inserted into the liquid therein to sterilize the same and after the test has been made, it may be sterilized in the same or a fresh container whereupon it will be in a septic condition for another use, while the container itself has been effectually rendered useless.

Clinical thermometers as now employed constitute a dangerous source of infection, and the need for a completely sanitary and antiseptic method of sterilizing them has long existed and been recognized for a considerable period and numerous attempts have been made to provide adequate means of protection against infection from this class of instruments but so far they have been unsuccessful.

A sterilizer of the construction above described being small, light and of flexible material may be readily carried on the person of the physician and in any number required for probable use, and owing to the cheap material of which it may be formed it may be discarded at but slight expense, while its temporary construction, and the necessity for its destruction by each use, insures its sanitary and antiseptic character, and affords means whereby the thermometer may be sterilized in clean liquid after each employment of the same.

Having thus described my invention, what I claim is:—

1. A single service sterilizer for clinical thermometers and like instruments comprising a tubular container of a size approximating the ordinary clinical thermometer casing, adapted to hold the sterilizing liquid, and having one end thereof closed and sealed, and through which end a clinical thermometer may be readily inserted into the sterilizing liquid after the tube has been ruptured, substantially as set forth.

2. A single service sterilizer for clinical thermometers and like instruments comprising a tubular container of a size approximating the ordinary clinical thermometer casing, adapted to hold the sterilizing liquid, having its respective ends closed and sealed and through which ends a clinical thermometer may be readily inserted into the sterilizing liquid after the tube has been ruptured, substantially as set forth.

3. A single service sterilizer for clinical thermometers and like instruments comprising a tubular container constructed of paraffined paper of a size approximating the ordinary clinical thermometer casing, adapted to hold the sterilizing liquid and having its respective ends closed and sealed, and through which ends a clinical thermometer may be readily inserted into the sterilizing liquid after the tube has been ruptured, substantially as set forth.

In witness whereof, I have hereunto set my hand and seal at Indianapolis this 12th day of July, A. D. nineteen hundred and seventeen.

MORTIMER BYE. [L. S.]

Witnesses:
H. P. DOOLITTLE,
M. F. SHULER.